United States Patent
Inada et al.

(10) Patent No.: US 7,947,934 B2
(45) Date of Patent: May 24, 2011

(54) HIGH FREQUENCY COOKWARE

(75) Inventors: Ikuhiro Inada, Nara (JP); Tomotaka Nobue, Nara (JP); Yuji Hayakawa, Nara (JP)

(73) Assignee: Panasonic Corporation, Osaka (JP)

( * ) Notice: Subject to any disclaimer, the term of this patent is extended or adjusted under 35 U.S.C. 154(b) by 1152 days.

(21) Appl. No.: 11/571,375

(22) PCT Filed: Jul. 1, 2005

(86) PCT No.: PCT/JP2005/012224
§ 371 (c)(1),
(2), (4) Date: Dec. 28, 2006

(87) PCT Pub. No.: WO2006/004051
PCT Pub. Date: Jan. 12, 2006

(65) Prior Publication Data
US 2008/0073338 A1 Mar. 27, 2008

(30) Foreign Application Priority Data

Jul. 2, 2004 (JP) ................................. 2004-196644
Jul. 2, 2004 (JP) ................................. 2004-196895

(51) Int. Cl.
*H05B 6/80* (2006.01)
*H05B 6/68* (2006.01)

(52) U.S. Cl. ......... 219/682; 219/756; 219/759; 219/710

(58) Field of Classification Search .................. 219/682, 219/401, 756, 681, 685, 687, 601, 629, 400, 219/716, 731, 710, 671; 134/95.1, 105, 115 R, 134/116 R, 22.18; 126/369, 378.1, 5, 20, 126/21 A
See application file for complete search history.

(56) References Cited

U.S. PATENT DOCUMENTS

| 5,786,577 A | 7/1998 | Han et al. |
| 2004/0025910 A1* | 2/2004 | Kanzaki et al. ............. 134/95.1 |

FOREIGN PATENT DOCUMENTS

| JP | 51-91375 | | 8/1976 |
| JP | 54-10460 | | 1/1979 |
| JP | 54-13992 | U | 1/1979 |
| JP | 54010460 | A * | 1/1979 |
| JP | 54-59373 | | 5/1979 |
| JP | 55-1138 | U | 1/1980 |
| JP | 56-162328 | A | 12/1981 |
| JP | 58-188501 | U | 12/1983 |
| JP | 9-026140 | | 1/1997 |
| JP | 10-009748 | A | 1/1998 |
| JP | 2004-011995 | | 1/2004 |

OTHER PUBLICATIONS

Microfilm of the specification and drawings annexed to the request of Japanese Utility Model Application No. 86604/1977 (Laid-open No. 13992/1979) (Mitsubishi Electric Corp.) Jan. 29, 1979.

(Continued)

*Primary Examiner* — Quang T Van
(74) *Attorney, Agent, or Firm* — Pearne & Gordon LLP

(57) ABSTRACT

To provide a high-frequency cooking apparatus of which installation performance, handling performance, and quality can be enhanced. A high-frequency cooking apparatus 10 for heat-processing an object to be heated, by supplying high frequency and steam into a heating chamber, is provided with a water tank 13 which stores water for generating the steam. The water tank 13 is detachably assembled toward the front to a lower part of a body 11 of the high-frequency cooking apparatus which has the heating chamber, and a tray 12 is integrally assembled to the water tank 13.

8 Claims, 9 Drawing Sheets

OTHER PUBLICATIONS

Microfilm of the specification and drawings annexed to the request of Japanese Utility Model Application No. 89625/1982 (Laid-open No. 192301/1983) (Mitsubishi Electric Corp.) Dec. 21, 1983.

Microfilm of the specification and drawings annexed to the request of Japanese Utility Model Application No. 107190/1978 (Laid-open No. 26259/1980) (Mitsubishi Electric Corp.) Feb. 20, 1980.

Japanese Office Action.

* cited by examiner

HIGH FREQUENCY COOKWARE

TECHNICAL FIELD

The present invention relates to a high-frequency cooking apparatus for heat-processing an object to be heated with high frequency combined with steam.

BACKGROUND ART

As an example of a related high-frequency cooking apparatus, a high-frequency cooking apparatus which is provided with a water tank in a side part of a body of the high-frequency cooking apparatus has been known (Reference should be made to Patent Document 1, for example).

The high-frequency cooking apparatus disclosed in Patent Document 1 is a heat cooking apparatus which supply high frequency (micro waves) and steam to a heating chamber which contains the object to be heated thereby to process by heating the object to be heated. This high-frequency cooking apparatus includes a magnetron as a high frequency generation part for generating high frequency, a steam generation part for generating steam in the heating chamber, a circulation fan for agitating and circulating an air in the heating chamber, a convection heater as an air heater for heating the air which circulates in the heating chamber, an infrared sensor for detecting temperature in the heating chamber through a detection hole formed on a wall face of the heating chamber, and a water tank for supplying water to the steam generation part.

In the high-frequency cooking apparatus disclosed in Patent Document 1, the water tank is detachably contained in a side wall of the body of the high-frequency cooking apparatus. The water tank is in a flat rectangular shape having an opening in its upper part and a lid. The lid is provided with a water intake tube fitting part. A water intake tube passing through the lid to extend up to a position near a bottom face of the high-frequency cooking apparatus is provided in a lower part of the water intake tube fitting part.

Patent Document 1: JP-A-2004-011995 (FIG. 1)

DISCLOSURE OF THE INVENTION

Problems that the Invention is to Solve

However, in the high-frequency cooking apparatus in the above described Patent Document 1, the water tank contained in the side wall of the body of the high-frequency cooking apparatus is positioned adjacent to the heating chamber and the convection heater, and hence, there is such anxiety that the water stored in the water tank may be heated. For this reason, it is necessary to provide a heat insulating material so that the water may not be heated, which is disadvantageous in respect of cost.

Moreover, because the water tank is detachably contained in the side wall of the body of the high-frequency cooking apparatus, a space for taking out the water tank is required. Therefore, the high-frequency cooking apparatus cannot be installed having its side part positioned close to a kitchen wall or the like, and installation performance is no good.

By the way, as shown in FIG. 11, there has been a high-frequency cooking apparatus 100 in which a water tank 101 is arranged in the side part, in the same manner as in the above described Patent Document 1. In FIG. 11, the high-frequency cooking apparatus is shown upside down. The high-frequency cooking apparatus 100 has a motor 105 at a center of a dented part 104 which is formed on a bottom face 103 of a body 102 of the high-frequency cooking apparatus. An electronic equipment 111 including a magnetron 106, a control board 107, an inverter 108, a circulation fan 109, and a heater 110 is mounted around the motor 105. A bottom plate 112 is secured to the dented part 104 with screws, and rubber legs 113 are attached to four corners of the bottom plate 112.

Moreover, the high-frequency cooking apparatus 100 is provided with a tray 115 below a door 114. When the door 114 is opened, after the high frequency and steam have been supplied into a heating chamber 116 and the object to be heated has been processed by heating, this tray 115 is adapted to receive frost water flowing out from the steam in the heating chamber 116. The tray 115 will be taken out, after the door 114 has been opened.

By operating the circulation fan 109, an air will be drawn into the high-frequency cooking apparatus 100 from a lower side of its front face thereby to cool the magnetron 106, and will be discharged in a lateral direction thereby to further cool the inverter 108.

In the high-frequency cooking apparatus 100 of this type too, there is such anxiety that the water stored in the water tank may be heated in the same manner as in the above described Patent Document 1, because the water tank 101 is contained in a side wall 117 of the body 102 of the high-frequency cooking apparatus, and the high-frequency cooking apparatus 100 cannot be installed having its side part positioned close to the wall.

Further, because the water tank 101 is arranged above the electronic equipment 111, in case where leakage of water from the water tank 101 has happened, the water may damage the electronic equipment 111 which is arranged below.

In order to overcome such problems, it is considered that the water tank is arranged below the body of the high-frequency cooking apparatus. However, the following problems should be solved first.

Generally, a whole body of the high-frequency cooking apparatus is covered with metal plates such as iron plates which have been adequately shaped by drawing work and connected by welding or caulking, as a countermeasure against leakage of waves. A bottom plate formed of metal is provided below the body of the high-frequency cooking apparatus, and the electronic equipment and so on are contained inside the bottom plate.

In case where the water tank is arranged below the body of the high-frequency cooking apparatus, a structure in which the water tank is inserted into the interior through an opening formed in the bottom plate is unfavorable, from a view point of the above described countermeasure against the leakage of waves.

On the other hand, in such a structure that the water tank is arranged further below the bottom plate, a total height of the high-frequency cooking apparatus will be increased, which will lead to upsizing of the high-frequency cooking apparatus.

The invention has been made in view of the above described circumstances, and a first object of the invention is to provide a high-frequency cooking apparatus of which installation performance, handling performance and quality can be enhanced, while leakage of waves can be prevented, and downsizing can be realized.

Moreover, the invention has been made in view of the above described circumstances, and a second object of the invention is to provide a high-frequency cooking apparatus of which installation performance, handling performance and quality can be enhanced.

Means for Solving the Problems

The above described first object of the invention will be attained by the following structure.

(1) A high-frequency cooking apparatus for heat-processing an object to be heated by supplying high frequency and steam into a heating chamber, the high-frequency cooking apparatus, comprising:

a water tank that stores water for generating the steam, wherein the water tank is detachably disposed in a dented part which is formed in a bottom plate provided in a lower part of a body of the high-frequency cooking apparatus having the heating chamber, the dented part being formed in the bottom plate so as to be separated from an installing face on which the cooking apparatus is to be installed by applying drawing work to the bottom plate.

In the high-frequency cooking apparatus having the above described structure, the water tank which stores water for generating the steam is detachably disposed toward the front in the lower part of the body of the high-frequency cooking apparatus. Therefore, the water tank is not positioned adjacent to the heating chamber and so on, and even in case where the heating chamber has been heated to high temperature, the heat will move upwardly. As the results, the water inside the water tank will not be heated, and the high-frequency cooking apparatus can be installed having its side part positioned close to a wall such as a kitchen wall.

Further, because the water tank is disposed in the dented part which is formed in the bottom plate provided in the lower part of the body of the high-frequency cooking apparatus, by applying drawing work to the bottom plate, so as to be separated from the installing face, a countermeasure against leakage of waves will not be affected. At the same time, the total height will not be increased, and hence, downsizing of the device can be achieved.

(2) The high-frequency cooking apparatus according to claim 1, wherein the water tank is arranged at an upstream side in a cooling path for an electronic equipment which is contained in a bottom part of the body of the high-frequency cooking apparatus.

In the high-frequency cooking apparatus having the above described structure, the water tank is positioned at the upstream side in the cooling path for the electronic equipment which is defined from the front face to the back face of the body of the high-frequency cooking apparatus. Therefore, the cooling medium which has been introduced from the front face of the body of the high-frequency cooking apparatus will flow along the water tank and will be supplied to the side of the electronic equipment after it has been once cooled in vicinity of the water tank. As the results, it is possible to efficiently cool the electronic equipment with the cooling medium which has become colder, and cooling efficiency can be enhanced.

(3) The high-frequency cooking apparatus according to claim 1, wherein an inner bottom face of the water tank has a downward inclination toward a water discharge port.

In the high-frequency cooking apparatus having the above described structure, because the inner bottom face of the water tank has a downward inclination toward the water discharge port, the water in the water tank can be reliably and completely discharged from the water discharge port, whereby a desired amount of steam can be stably generated.

(4) The high-frequency cooking apparatus according to claim 3, wherein the inner bottom face has a substantially vessel-like shape.

In the high-frequency cooking apparatus having the above described structure, because the inner bottom face of the water tank has a substantially vessel-like shape, the water in the water tank can be reliably guided to the discharge port, as compared with a case where the inner bottom face is flat.

The above described second object of the invention will be attained by the following structure.

(1) A high-frequency cooking apparatus for heat-processing an object to be heated by supplying high frequency and steam into a heating chamber, the high-frequency cooking apparatus, comprising:

a water tank that stores water for generating the steam; and a tray that is integrally assembled to the water tank, wherein the water tank is detachably assembled toward the front in a lower part of a body of the high-frequency cooking apparatus having the heating chamber.

In the high-frequency cooking apparatus having the above described structure, because the water tank in which water for generating steam is stored and the tray are arranged below the body of the high-frequency cooking apparatus, the water tank is not positioned adjacent to the heating chamber. Even in case where the heating chamber has been heated to high temperature, the heat will move upwardly, and the water stored inside the water tank will not be heated. Moreover, because the water tank is detachably assembled to the front face of the body of the high-frequency cooking apparatus, it is possible to install the high-frequency cooking apparatus having its side part positioned close to the wall. Further, because the water tank is not arranged above the electronic equipment which is contained in the bottom of the body of the high-frequency cooking apparatus, the electronic equipment will not be damaged. Still further, because the water tank and the tray can be simultaneously taken out from the front face of the body of the high-frequency cooking apparatus, good handling performance can be obtained. Still further, the tray for receiving frost water which will flow out along the inner face of the door panel, when the door panel is opened after the high frequency and steam have been supplied and the object to be heated has been processed by heating, is integrally assembled to the water tank. Therefore, as compared with a case where the water tank is arranged in the side part of the body of the high-frequency cooking apparatus and the tray is arranged on the front face of the body of the high-frequency cooking apparatus, it is possible to contain the water tank and the tray in one place. Accordingly, there is no useless space, and the high-frequency cooking apparatus can be made compact. In this manner, it is possible to enhance installing performance, handling performance and quality of the high-frequency cooking apparatus.

(2) A high-frequency cooking apparatus for heat-processing an object to be heated by supplying high frequency and steam into a heating chamber, the high-frequency cooking apparatus, comprising:

a water tank that stores water for generating the steam; and a tray that is integrally assembled to the water tank, wherein the water tank is detachably disposed toward the front in a lower part of a body of the high-frequency cooking apparatus having the heating chamber; and wherein the tray is arranged in front of the water tank.

In the high-frequency cooking apparatus having the above described structure, because the water tank in which water for generating steam is stored and the tray are arranged below the body of the high-frequency cooking apparatus, the water tank is not positioned adjacent to the heating chamber. Accordingly, even in case where the heating chamber has been heated to high temperature, the heat will move upwardly, and the water stored inside the water tank will not be heated. Moreover, because the water tank is detachably assembled to the front face of the body of the high-frequency cooking apparatus, it is possible to install the high-frequency cooking apparatus having its side part positioned close to the wall. Further, because the water tank is not arranged above the electronic equipment which is contained in the bottom of the body of the high-frequency cooking apparatus, the electronic equipment will not be damaged. Still further, because the water tank and the tray can be simultaneously taken out from the front face of the body of the high-frequency cooking apparatus, good handling performance can be obtained. Still further, the tray for receiving frost water which will flow out along the inner face of the door panel, when the door panel is opened after the high frequency and steam have been supplied and the object to be heated has been processed by heating, is arranged in front of the water tank. Therefore, replenishment of water to the water tank and cleaning of the tray can be simultaneously performed, and hence, daily maintenance can be easily conducted. In this manner, it is possible to enhance installing performance, handling performance and quality of the high-frequency cooking apparatus.

(3) A high-frequency cooking apparatus for heat-processing an object to be heated by supplying high frequency and steam into a heating chamber, the high-frequency cooking apparatus, comprising:

a water tank that stores water for generating the steam; and a tray that is integrally assembled to the water tank, wherein the water tank is detachably disposed toward the front in a lower part of a body of the high-frequency cooking apparatus having the heating chamber; and wherein the tray and the water tank are arranged right and left at a front side of the body of the high-frequency cooking apparatus.

In the high-frequency cooking apparatus having the above described structure, because the water tank in which water for generating steam is stored and the tray are arranged below the body of the high-frequency cooking apparatus, the water tank is not positioned adjacent to the heating chamber. Accordingly, even in case where the heating chamber has been heated to high temperature, the heat will move upwardly, and the water stored inside the water tank will not be heated. Moreover, because the water tank is detachably assembled to the front face of the body of the high-frequency cooking apparatus, it is possible to install the high-frequency cooking apparatus having its side part positioned close to the wall. Further, because the water tank is not arranged above the electronic equipment which is contained in the bottom of the body of the high-frequency cooking apparatus, the electronic equipment will not be damaged. Still further, because the water tank and the tray can be simultaneously taken out from the front face of the body of the high-frequency cooking apparatus, good handling performance can be obtained. Still further, the tray for receiving frost water which will flow out along the inner face of the door panel, when the door panel is opened after the high frequency and steam have been supplied and the object to be heated has been processed by heating, and the water tank are arranged right and left in front of the body of the high-frequency cooking apparatus, it is possible to confirm the remaining amount of water through the front face of the water tank which is positioned either right or left, without taking out the water tank.

(4) A high-frequency cooking apparatus for heat-processing an object to be heated by supplying high frequency and steam into a heating chamber, the high-frequency cooking apparatus, comprising:

a water tank that stores water for generating the steam; and a tray that is integrally assembled to the water tank, wherein the water tank is detachably disposed toward the front in a lower part of a body of the high-frequency cooking apparatus having the heating chamber; and wherein the tray and the water tank are arranged above and below at a front side of the body of the high-frequency cooking apparatus.

In the high-frequency cooking apparatus having the above described structure, because the water tank in which water for generating steam is stored and the tray are arranged below the body of the high-frequency cooking apparatus, the water tank is not positioned adjacent to the heating chamber. Accordingly, even in case where the heating chamber has been heated to high temperature, the heat will move upwardly, and the water stored inside the water tank will not be heated. Moreover, because the water tank is detachably assembled to the front face of the body of the high-frequency cooking apparatus, it is possible to install the high-frequency cooking apparatus having its side part positioned close to the wall. Further, because the water tank is not arranged above the electronic equipment which is contained in the bottom of the body of the high-frequency cooking apparatus, the electronic equipment will not be damaged. Still further, because the water tank and the tray can be simultaneously taken out from the front face of the body of the high-frequency cooking apparatus, good handling performance can be obtained. Still further, the tray for receiving frost water which will flow out along the inner face of the door panel, when the door panel is opened after the high frequency and steam have been supplied and the object to be heated has been processed by heating, and the water tank are arranged above and below in front of the body of the high-frequency cooking apparatus, it is possible to confirm the remaining amount of water through the front face of the water tank which is positioned either above or below, without taking out the water tank.

ADVANTAGE OF THE INVENTION

According to the high-frequency cooking apparatus of the invention, it is possible to solve those problems that the water in the water tank is heated, that the installation performance is no good, and that the electronic equipment is liable to be damaged. In this manner, it is possible to obtain such advantage that the installation performance and quality can be enhanced.

Moreover, according to the high-frequency cooking apparatus of the invention, it is possible to solve those problems that the water in the water tank is heated, that the installation performance is no good, that the high-frequency cooking apparatus cannot be easily handled, and that the electronic equipment is liable to be damaged. In this manner, it is possible to obtain such advantage that the installation performance, handling performance, and quality can be enhanced.

Figure 1:
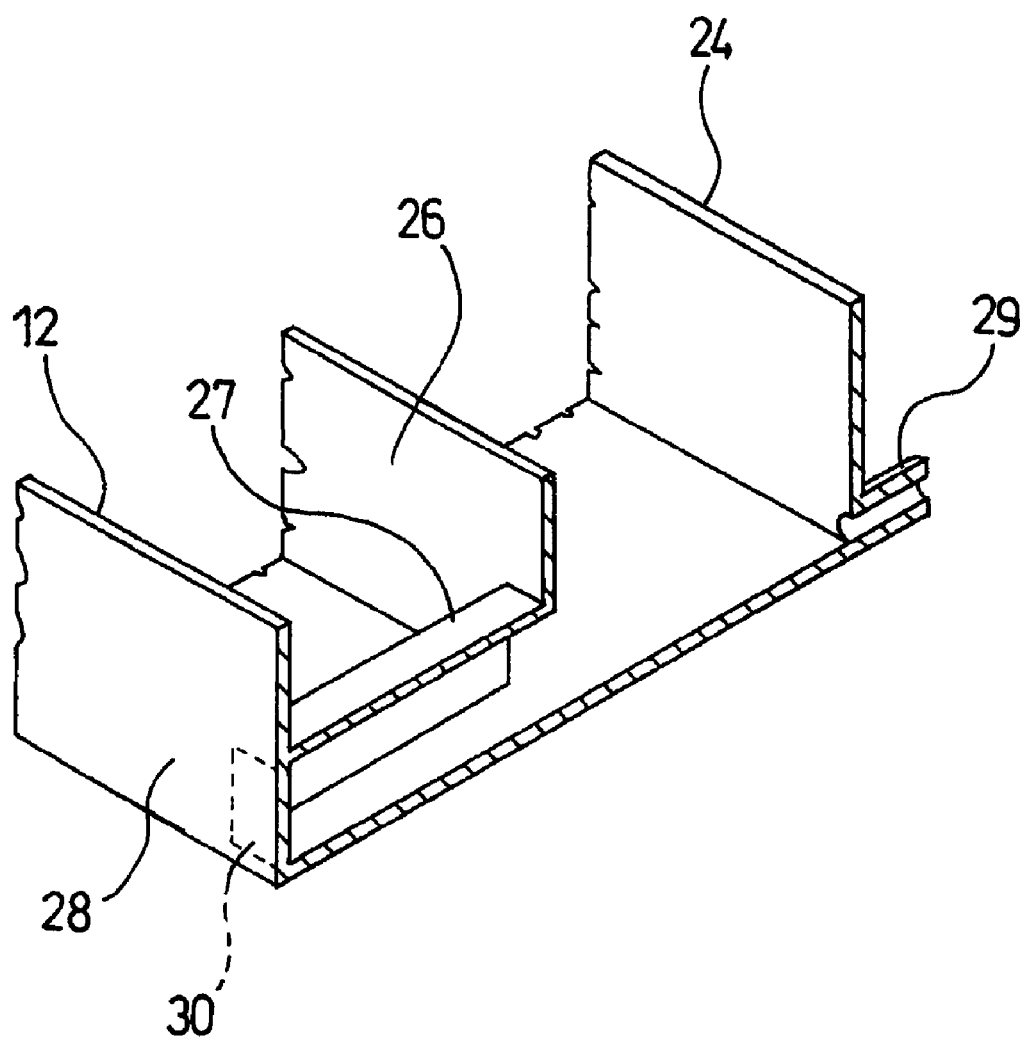
FIG. 1 is an exploded perspective view for describing a high-frequency cooking apparatus in a first embodiment according to the invention.

DESCRIPTION OF THE REFERENCE NUMERALS 10, 40, 50, 60, 70, 80, 90 High-frequency cooking apparatus
11 Body of the high-frequency cooking apparatus
12, 41, 51, 61, 71, 81 Tray
13, 42, 54, 62, 74, 82, 92 Water tank
16 Electronic equipment

BEST MODE FOR CARRYING OUT THE INVENTION

Now, referring to the drawings, a plurality of preferred embodiments of the high-frequency cooking apparatus according to the invention will be described in detail.

First Embodiment

Figure 2:
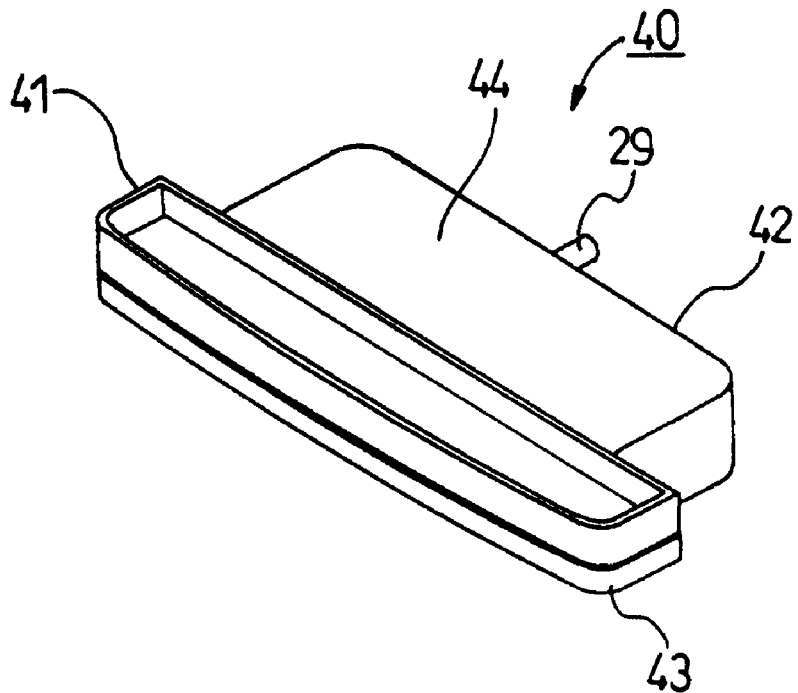
FIG. 2 is a perspective view partly cut away of a water tank of the high-frequency cooking apparatus in FIG. 1.
Figure 2:
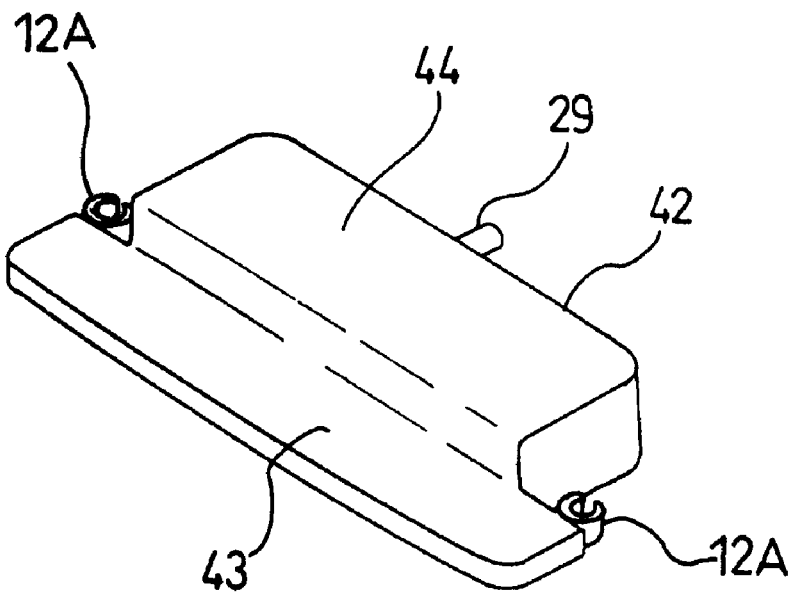

FIG. 1 is an exploded perspective view for describing a high-frequency cooking apparatus in a first embodiment according to the invention, and FIG. 2 is a perspective view partly cut away of a water tank in FIG. 1.

As shown in FIG. 1, a high-frequency cooking apparatus 10 in the first embodiment according to the invention includes a body 11 of the high-frequency cooking apparatus, a tray 12, and a water tank 13. The tray 12 and the water tank 13 are detachably assembled to a front face of the body 11 of the high-frequency cooking apparatus.

Figure 11:
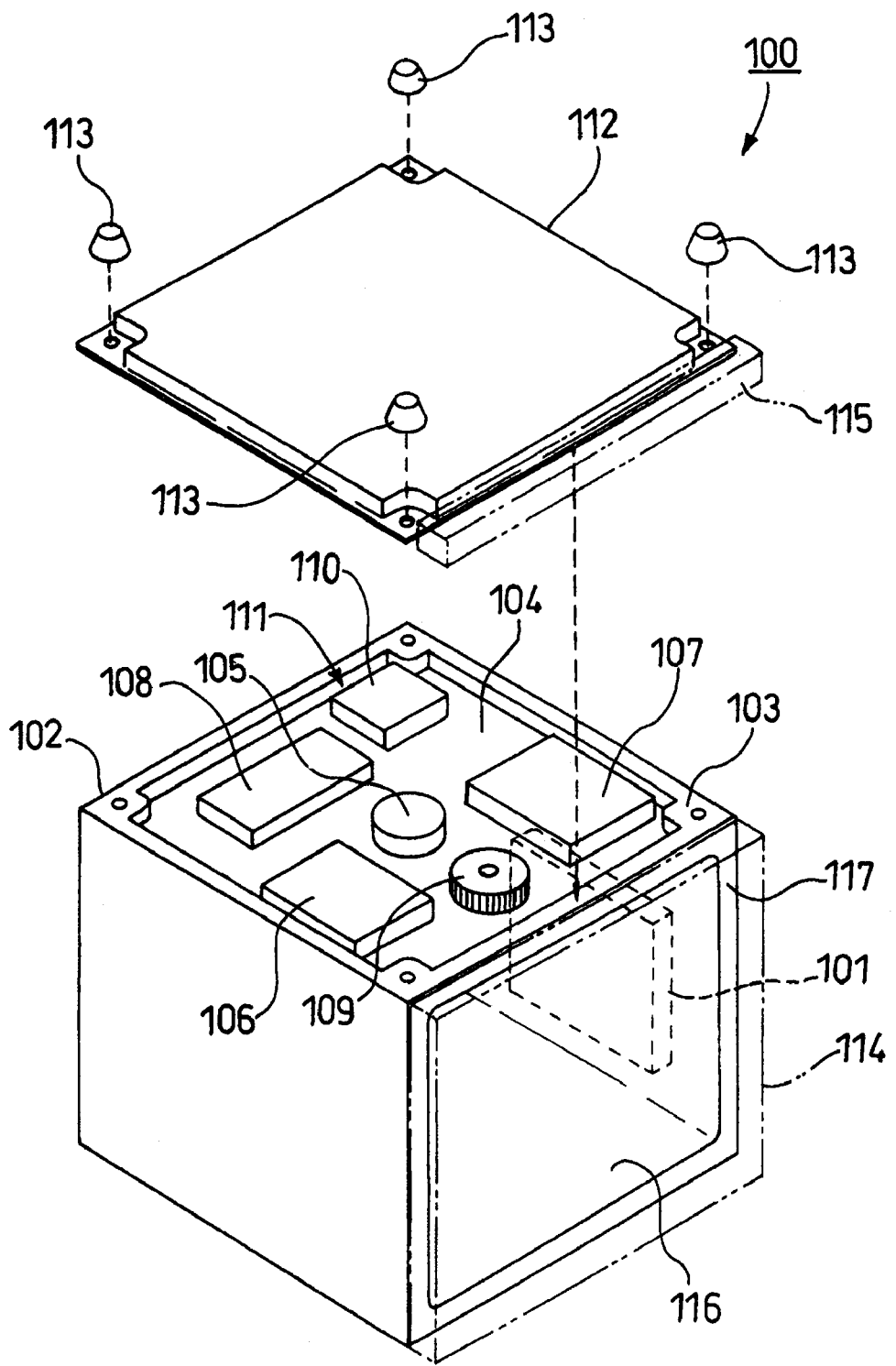
FIG. 11 is an exploded perspective view of a conventional high-frequency cooking apparatus.

An electronic equipment 16 (See FIG. 11) including a magnetron, a control board, an inverter, a motor and so on is mounted on an upper part of a bottom plate 14 in the bottom of the body 11 of the high-frequency cooking apparatus around a circulation fan 15.

The bottom plate 14 closes a lower part of the body 11 of the high-frequency cooking apparatus as a countermeasure against leakage of waves, and four threaded holes 17 are formed in a circumferential area of the bottom plate 14. Screws (not shown) are inserted into the threaded holes 17 and screwed into a lower face of the body 11 of the high-frequency cooking apparatus, whereby the bottom plate 14 is assembled to the body 11 of the high-frequency cooking apparatus so as to cover a lower part of the electronic equipment 16 which is contained in the bottom of the body 11 of the high-frequency cooking apparatus.

A tray receiving part 18 and a water tank receiving part 19 are formed in front of the bottom plate 14. The tray receiving part 18 which will receive the tray 12 is formed in a concave shape having an L-shape, in a lower part of the body 11 of the high-frequency cooking apparatus. The water tank receiving part 19 which will receive the water tank 13 is formed in a center part of the tray receiving part 18 in a shape of rectangular recess having a depth toward a back face of the body 11 of the high-frequency cooking apparatus.

These tray receiving part 18 and water tank receiving part 19 are dented parts which have been formed by applying drawing work to the bottom plate 14 so as to be separated from an installing face such as a cooking table on which the high-frequency cooking apparatus 10 is installed.

In this manner, the tray 12 and the water tank 13 are arranged below the bottom plate 14, because they are respectively contained in the tray receiving part 18 and the water tank receiving part 19.

A back plate 20 of the water tank receiving part 19 is formed with a joint insertion hole 21 in its center part, and a plurality of air holes 22 are formed at both sides of the joint insertion hole 21. The joint insertion hole 21 and the air holes 22 are communicated from the front face of the body 11 of the high-frequency cooking apparatus to an interior of the dented part (See FIG. 11) in the bottom of the body 11 of the high-frequency cooking apparatus, which is an upper face of the bottom plate 14.

The tray 12 is molded of transparent or translucent resin material, for example. The tray 12 has a width substantially equal to a width of the body 11 of the high-frequency cooking apparatus in a lateral direction and a predetermined depth, and opens upward. The tray 12 is inserted into the tray receiving part 18 from the front face of the body 11 of the high-frequency cooking apparatus, whereby its upper part which is open will be positioned below a door panel 23. Accordingly, when the door panel 23 is opened after the high frequency and steam have been supplied and the object to be heated has been processed by heating, the tray 12 will receive frost water flowing out along an inner face of the door panel 23.

The water tank 13 includes a tank body 24 and a lid 25. The tank body 24 is molded of transparent or translucent resin material, for example, in the same manner as the tray 12. The tank body 24 is integrally coupled to a back plate 26 of the tray 12 and opens upward. The tank body 24 which has stored water is inserted into the water tank receiving part 19 from the front face of the body 11 of the high-frequency cooking apparatus thereby to be disposed in the lower part of the body 11 of the high-frequency cooking apparatus. In this manner, the tank body 24 is not positioned adjacent to the heating chamber and so on. Accordingly, even in case where the heating chamber is heated to high temperature, the heat will move upwardly, and the water stored inside the tank body 24 will not be heated. Moreover, because the tank body 24 is not arranged above the electronic equipment 16 which is contained in the bottom part of the body 11 of the high-frequency cooking apparatus, the electronic equipment 16 will not be damaged. The lid 25 is put on an upper part of the tank body 24 thereby to close the open part. The tank body 24 may be integrally molded with the tray 12, or may be separately molded, and then, bonded to the tray 12 by an adhesive or the like.

A communication tube 27 communicated and connected with a substantially center part of the tray 12 is provided in front of the tank body 24. Moreover, a joint 29 in a cylindrical shape communicated with an interior of the tank body 24 is provided on a back face of the tank body 24. When the water tank 13 is received in the water tank receiving part 19, the joint 29 is inserted into the joint insertion hole 21 of the water tank receiving part 19, thereby to be connected for communication to a steam generation part (not shown) which is provided together with the electronic equipment 16. In this manner, the water stored in the tank body 24 will be supplied to the steam generation part. When the tank body 24 has been received in the water tank receiving part 19, the tank body 24 is positioned at an upstream side in a cooling path for the electronic equipment 16 which is defined from the front face to the back face of the body 11 of the high-frequency cooking apparatus. When the circulation fan 15 is actuated, due to a negative pressure generated by the circulation fan 15, the air in the water tank receiving part 19 will be introduced to an area of the electronic equipment 16 through the plurality of air holes 22 in the back plate 20 of the water tank receiving part 19. In this manner, the air as a cooling medium which has been introduced from the front face of the body 11 of the high-frequency cooking apparatus will flow along the tank body 24, and will be supplied to the area of the electronic equipment 16 after it has been once cooled. Therefore, it is possible to efficiently cool the electronic equipment 16 with the air which has become colder.

As shown in FIG. 2, the communication tube 27 is extended from an inside of the tank body 24 through the back plate 26 of the tray 12 up to an inner wall of a front plate 28 of the tray 12. Therefore, an amount of the water stored in the water tank 13 can be visually confirmed through a calibrated part 30 which is provided at the front side of the body 11 of the high-frequency cooking apparatus.

These tray 12 and water tank 13 will be held by inserting the joint 29 into the joint insertion hole 21, and then, by engaging the rubber legs (See FIG. 11) with a pair of engaging parts 12A in a substantially C-shape which are provided on the tray 12.

In the high-frequency cooking apparatus 10 having the above described structure, the lid 25 will be put on, after the water has been stored in the tank body 24 of the water tank 13, and the water tank 13 will be inserted into the water tank receiving part 19 from the tank body 24. At the same time, the tray 12 will be inserted into the tray receiving part 18, thereby to be assembled to the body 11 of the high-frequency cooking apparatus in such a manner that the upper part of the tray 12 which is open may be positioned below the door panel 23. The amount of the water stored in the tank body 24 can be confirmed by observing the calibrated part 30 on the front face of the tray 12. In case where the amount of the water in the tank body 24 has decreased, the tray 12 and the water tank 13 will be taken out to replenish water.

According to the high-frequency cooking apparatus 10 as described above, because the water tank 13 in which water for generating steam is stored and the tray 12 are disposed below the body 11 of the high-frequency cooking apparatus, the water tank 13 is not positioned adjacent to the heating chamber. Even in case where the heating chamber is heated to high temperature, the heat will move upwardly, and the water stored inside the water tank 13 will not be heated. Moreover, because the water tank 13 is detachably assembled to the front face of the body 11 of the high-frequency cooking apparatus, it is possible to install the high-frequency cooking apparatus having its side part positioned close to the wall such as the kitchen wall.

Further, because the water tank 13 is not arranged above the electronic equipment 16 which is contained in the bottom of the body 11 of the high-frequency cooking apparatus, in case where the water in the water tank 13 has happened to leak, the water will only flow downward lower than the bottom plate 14, and will not damage the electronic equipment 16. In this manner, the installation performance and quality can be enhanced.

Still further, because the water tank 13 and the tray 12 can be simultaneously taken out from the front face of the body 11 of the high-frequency cooking apparatus, good handling performance can be obtained. Still further, the tray 12 for receiving frost water which will flow out along the inner face of the door panel 23, when the door panel 23 is opened after the high frequency and steam have been supplied and the object to be heated has been processed by heating, is integrally assembled to the water tank 13. Therefore, as compared with a case where the water tank is arranged in the side part of the body of the high-frequency cooking apparatus and the tray is arranged on the front face of the body of the high-frequency cooking apparatus, it is possible to contain the water tank 13 and the tray 12 in one place. Accordingly, there is no useless space, and the high-frequency cooking apparatus can be made compact. Still further, because the tray 12 is arranged in front of the water tank 13, replenishment of water to the water tank 13 and cleaning of the tray 12 can be simultaneously performed, and hence, daily maintenance can be easily conducted. In this manner, it is possible to enhance installing performance, handling performance, and quality of the high-frequency cooking apparatus.

Additionally, according to the high-frequency cooking apparatus 10 as described above, because the water tank 13 is arranged at the upstream side in the cooling path for the electronic equipment 16 which is defined from the front face to the back face of the body 11 of the high-frequency cooking apparatus, the air introduced from the front face of the body 11 of the high-frequency cooking apparatus will flow along the water tank 13 and will be supplied to the area of the electronic equipment 16 after the air has been once cooled in vicinity of the water tank 13. Therefore, the electronic equipment 16 can be efficiently cooled with the air which has become colder, and cooling efficiency can be enhanced.

Still further, according to the high-frequency cooking apparatus 10 as described above, the water tank 13 can be disposed utilizing the whole width of the body 11 of the high-frequency cooking apparatus on the front face thereof. Therefore, as compared with a case where the water tank is disposed in the side part of the body of the high-frequency cooking apparatus, a larger capacity of the water tank 13 can be obtained, and at the same time, the entirety of the high-frequency cooking apparatus 10 can be flat-shaped.

Still further, the tray 12 and the water tank 13 are respectively disposed in the tray receiving part 18 and the water tank receiving part 13 which are the dented parts in the bottom plate 14 provided as the countermeasure against leakage of waves. Therefore, the bottom plate 14 need not be provided with an opening or the like which may badly affect the countermeasure against leakage of waves. At the same time, the total height of the high-frequency cooking apparatus 10 will not be influenced by thicknesses of the tray 12 and the water tank 13, and upsizing of the device can be avoided.

Second Embodiment

Figure 3:
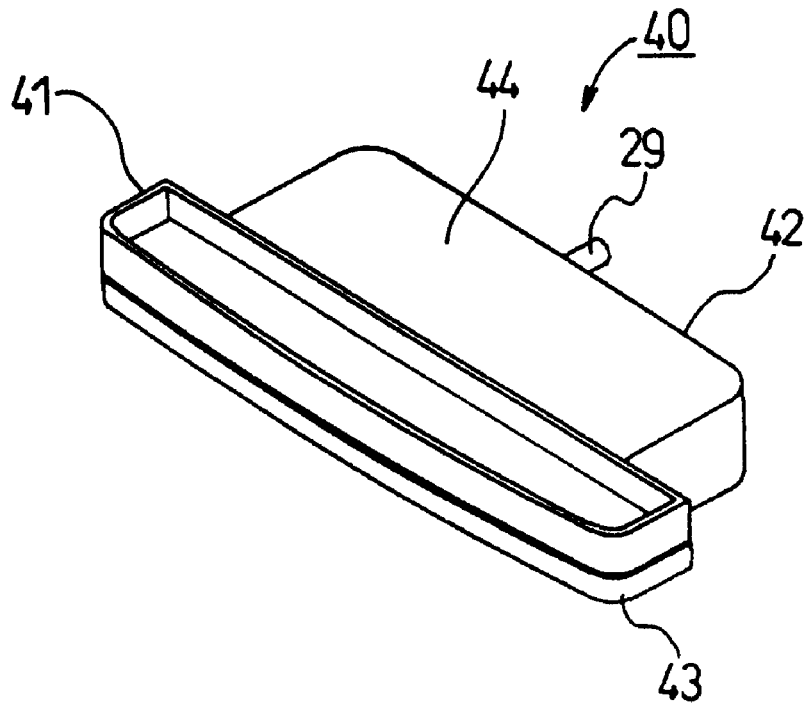
FIG. 3(a) is a perspective view of an outer appearance of a water tank and a tray to be used in the high-frequency cooking apparatus in a second embodiment according to the invention, in a state assembled to each other.
FIG. 3(b) is a perspective view of an outer appearance of the water tank only.
Figure 3:
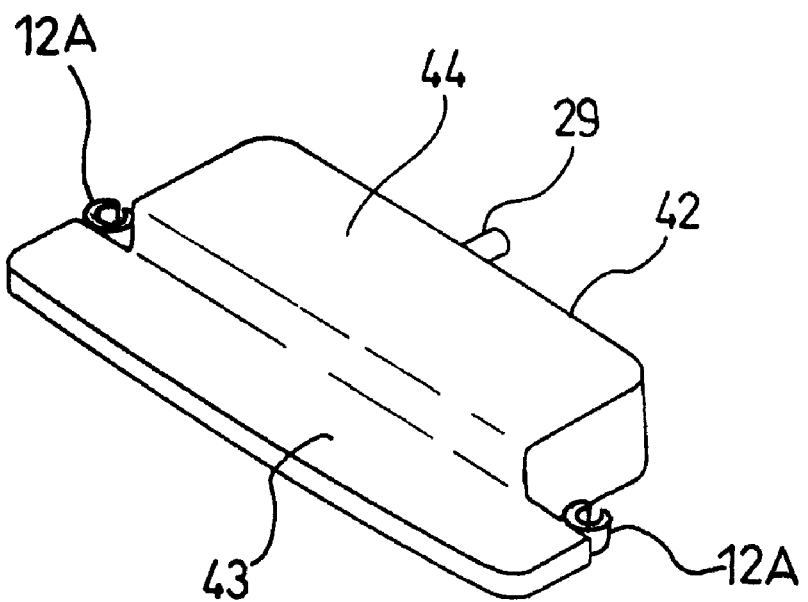

Then, a high-frequency cooking apparatus in a second embodiment according to the invention will be described referring to FIGS. 3(a) and (b). FIG. 3(a) is a perspective view of an outer appearance of a water tank and a tray to be used in the high-frequency cooking apparatus in the second embodiment according to the invention, in a state assembled to each other, and FIG. 3(b) is a perspective view of an outer appearance of the water tank only in FIG. 3(a). It is to be noted that the same or the substantially same parts as those in the first embodiment will be omitted from description or will be briefly described.

As shown in FIG. 3(a), a tray 41 to be used in a high-frequency cooking apparatus 40 in the second embodiment is molded of transparent or translucent resin material, for example. The tray 41 has a substantially same width as a lateral width of the body 11 of the high-frequency cooking apparatus and a predetermined depth, and opens upward. The tray 41 is mounted on an extended part 43 which is formed on a front face of a water tank 42 thereby to be assembled to the water tank 42. Referring to FIG. 1, the tray 41 is inserted into the tray receiving part 18 from the front face of the body 11 of the high-frequency cooking apparatus, whereby its upper part which is open will be positioned below the door panel 23. Accordingly, when the door panel 23 is opened after the high frequency and steam have been supplied and the object to be heated has been processed by heating, the tray 41 will receive frost water flowing out along the inner face of the door panel 23.

As shown in FIG. 3(b), the water tank 42 to be used in the high-frequency cooking apparatus 40 in the second embodiment is molded of transparent or translucent resin material, for example, in the same manner as the tray 41. The water tank 42 has a tank body 44 having a tall height, and the extended part 43 having the same width as the tray 41 is formed lower in front of the tank body 44. Water is stored in the tank body 44 and the extended part 43.

Referring to FIG. 1, after the water has been stored, the water tank 42 is inserted into the water tank receiving part 19 from the front face of the body 11 of the high-frequency cooking apparatus, whereby the water tank 42 will be arranged below the body 11 of the high-frequency cooking apparatus. On this occasion, since the extended part 43 of the water tank 42 is arranged on the front face of the body 11 of the high-frequency cooking apparatus, an amount of the water stored in the water tank 42 can be visually confirmed through the extended part 43. The tray 41 may be integrally molded on the extended part 43 of the water tank 42. Alternatively, the tray 41 and the water tank 42 may be formed separately and then, bonded to each other by an adhesive or the like. The water tank 42 is provided with a water replenishing port (not shown) in a part of the tank body 44, for example.

According to the high-frequency cooking apparatus 40 in the second embodiment as described above, the water tank 42 in which water for generating steam is stored and the tray 41 are arranged below the body 11 of the high-frequency cooking apparatus, and therefore, the water tank 42 is not positioned adjacent to the heating chamber. Even in case where the heating chamber has been heated to high temperature, the heat will move upwardly, and the water stored inside the water tank will not be heated. Moreover, because the water tank 42 is detachably assembled to the front face of the body 11 of the high-frequency cooking apparatus, it is possible to install the high-frequency cooking apparatus having its side part positioned close to the wall. Further, because the water tank 42 is not arranged above the electronic equipment 16 which is contained in the bottom of the body 11 of the high-frequency cooking apparatus, the electronic equipment 16 will not be damaged. Still further, because the water tank 42 and the tray 41 can be simultaneously taken out from the front face of the body 11 of the high-frequency cooking apparatus, good handling performance can be obtained. Still further, the tray 41 for receiving frost water which will flow out along the inner face of the door panel 23, when the door panel 23 is opened after the high frequency and steam have been supplied and the object to be heated has been processed by heating, is integrally assembled to the water tank 42. Therefore, as compared with a case where the water tank is arranged in the side part of the body of the high-frequency cooking apparatus and the tray is arranged on the front face of the body of the high-frequency cooking apparatus, it is possible to contain the water tank 42 and the tray 41 in one place. Accordingly, there is no useless space, and the high-frequency cooking apparatus can be made compact. Still further, because the tray 41 is arranged in front of the water tank 42, replenishment of water to the water tank 42 and cleaning of the tray 41 can be simultaneously performed, and hence, daily maintenance can be easily conducted. Still further, the tray 41 and the water tank 42 are arranged above and below in front of the body 11 of the high-frequency cooking apparatus, it is possible to confirm a remaining amount of the water through the extended part 43 of the water tank 42 which is positioned at a lower side, without taking out the water tank 42. In this manner, installing performance, handling performance and quality of the high-frequency cooking apparatus can be enhanced.

Third Embodiment

Figure 4:
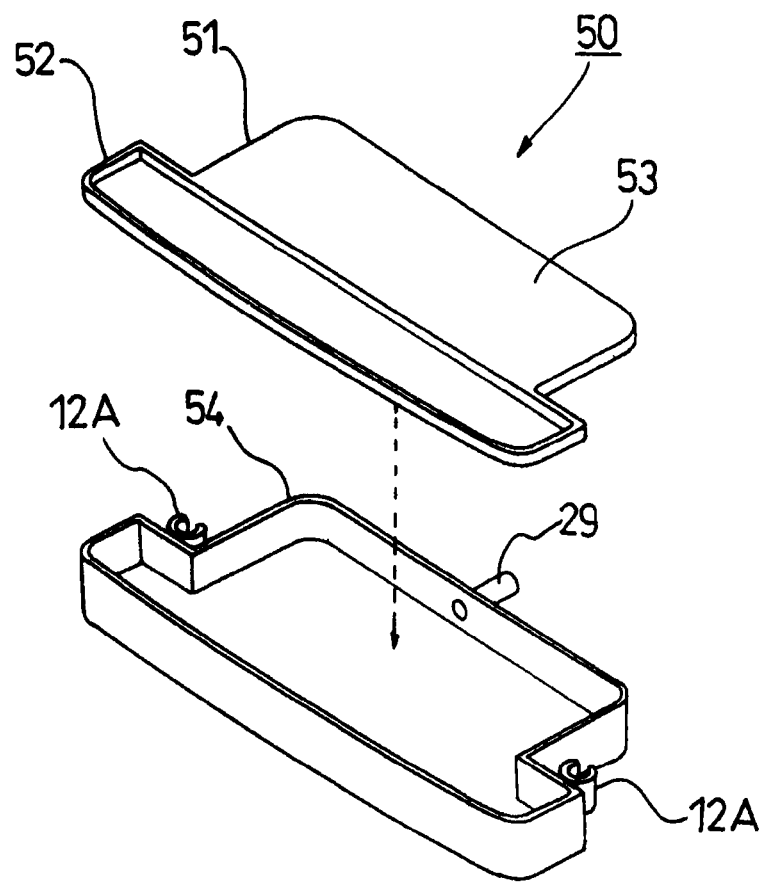
FIG. 4(a) is a perspective view of an outer appearance of a water tank and a tray to be used in the high-frequency cooking apparatus in a third embodiment according to the invention, before they are assembled to each other.
FIG. 4(b) is a sectional view of the water tank and tray in the assembled state.
Figure 4:
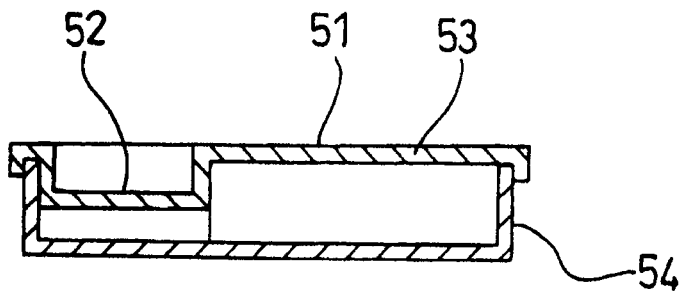

Then, a high-frequency cooking apparatus in a third embodiment according to the invention will be described referring to FIGS. 4(a) and (b). FIG. 4(a) is a perspective view of an outer appearance of a water tank and a tray to be used in the high-frequency cooking apparatus in the third embodiment according to the invention, before they are assembled to each other, and FIG. 4(b) is a sectional view of the water tank and the tray in FIG. 4(a) in an assembled state. The same or the substantially same parts as those in the first embodiment will be omitted from description or will be briefly described.

As shown in FIG. 4(a), a tray 51 to be used in a high-frequency cooking apparatus 50 in the third embodiment is molded of transparent or translucent resin material, for example, and formed in a plate-like shape having a substantially T-shape. The tray 51 includes a tray body 52 which has a substantially same width as the lateral width of the body 11 of the high-frequency cooking apparatus and a predetermined depth, and opens upward, and a lid part 53 which is integrally molded with the tray body 52. The tray 51 is assembled to a water tank 54 so as to cover an open part on an upper face of the water tank 54. Referring to FIG. 1, the tray 51 is inserted into the tray receiving part 18 from the front face of the body 11 of the high-frequency cooking apparatus, whereby its upper part which is open will be positioned below the door panel 23. Accordingly, when the door panel 23 is opened after the high frequency and steam have been supplied and the object to be heated has been processed by heating, the tray 51 will receive frost water flowing out along the inner face of the door panel 23.

The water tank 54 to be used in the high-frequency cooking apparatus 50 in the third embodiment is molded of transparent or translucent resin material, for example, in the same manner as the tray 51, and formed into a substantially T-shaped box-like shape which is open upward.

As shown in FIG. 4(b), the tray 51 will be put on the upper part of the water tank 54, thereby to cover the water tank 54.

Referring to FIG. 1, after the water has been stored, the water tank 54 is inserted into the water tank receiving part 19 from the front face of the body 11 of the high-frequency cooking apparatus, whereby the water tank will be arranged below the body 11 of the high-frequency cooking apparatus. On this occasion, since the front face of the water tank 54 is arranged on the front face of the body 11 of the high-frequency cooking apparatus, an amount of the water stored in the water tank 54 can be visually confirmed through the front face.

In the high-frequency cooking apparatus 50 in the third embodiment, daily cleaning can be conducted easily, because the water tank 54 and the tray 51 can be taken out and disassembled, and hence, the high-frequency cooking apparatus 50 is hygienically favorable. In addition, by illuminating the water tank 54 in a state contained in the water tank receiving part 19 with a light from a backward side, it is possible to confirm more easily and reliably the remaining amount of the water.

According to the high-frequency cooking apparatus 50 in the third embodiment as described above, because the water tank 54 in which water for generating steam is stored and the tray 51 are arranged below the body 11 of the high-frequency cooking apparatus, the water tank 54 is not positioned adjacent to the heating chamber. Accordingly, even in case where the heating chamber has been heated to high temperature, the heat will move upwardly, and the water stored inside the water tank will not be heated. Moreover, because the water tank 54 is detachably assembled to the front face of the body 11 of the high-frequency cooking apparatus, it is possible to install the high-frequency cooking apparatus having its side part positioned close to the wall. Further, because the water tank 54 is not arranged above the electronic equipment 16 which is contained in the bottom of the body 11 of the high-frequency cooking apparatus, the electronic equipment 16 will not be damaged. Still further, because the water tank 54 and the tray 51 can be simultaneously taken out from the front face of the body 11 of the high-frequency cooking apparatus, good handling performance can be obtained. Still further, the tray 51 for receiving frost water which will flow out along the inner face of the door panel 23, when the door panel 23 is opened after the high frequency and steam have been supplied and the object to be heated has been processed by heating, is integrally assembled to the water tank 54. Therefore, as compared with a case where the water tank is arranged in the side part of the body of the high-frequency cooking apparatus and the tray is arranged on the front face of the body of the high-frequency cooking apparatus, it is possible to contain the water tank 54 and the tray 51 in one place. Consequently, there is no useless space, and the high-frequency cooking apparatus can be made compact. Still further, because the tray 51 is arranged in front of the water tank 54, replenishment of water to the water tank 54 and cleaning of the tray 51 can be simultaneously performed, and hence, daily maintenance can be easily conducted. Still further, the tray 51 and the water tank 54 are arranged above and below in front of the body 11 of the high-frequency cooking apparatus, it is possible to confirm the remaining amount of water through the front face of the water tank 54 which is positioned below, without taking out the water tank 54. In this manner, installing performance, handling performance and quality of the high-frequency cooking apparatus can be enhanced.

Fourth Embodiment

Figure 5:
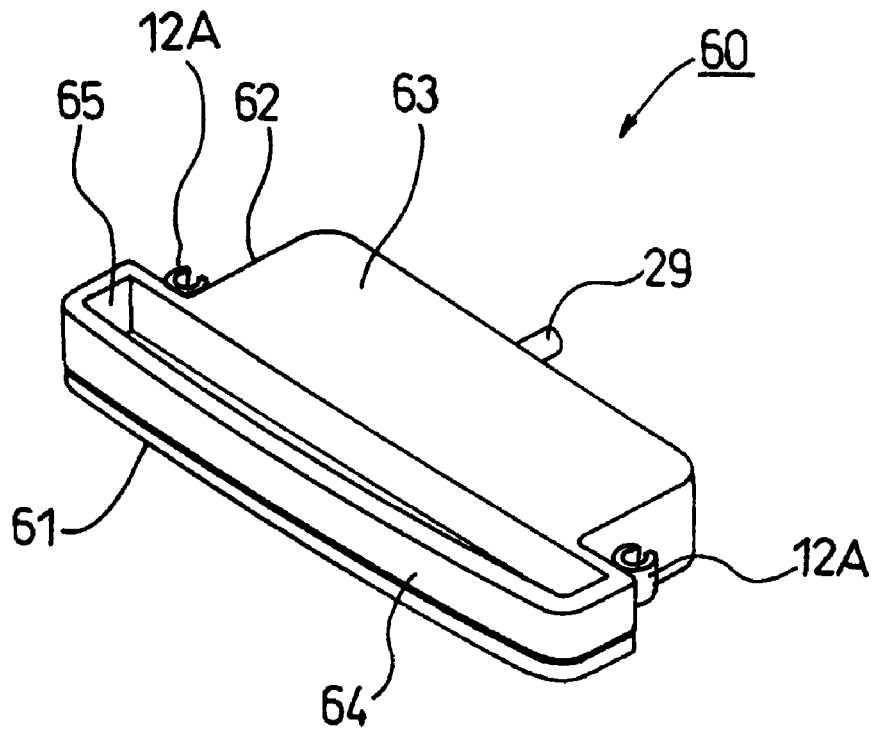
FIG. 5(a) is a perspective view of an outer appearance of a water tank and a tray to be used in the high-frequency cooking apparatus in a fourth embodiment according to the invention, in a state assembled to each other.
FIG. 5(b) is a sectional view of the water tank and tray in the assembled state.
Figure 5:
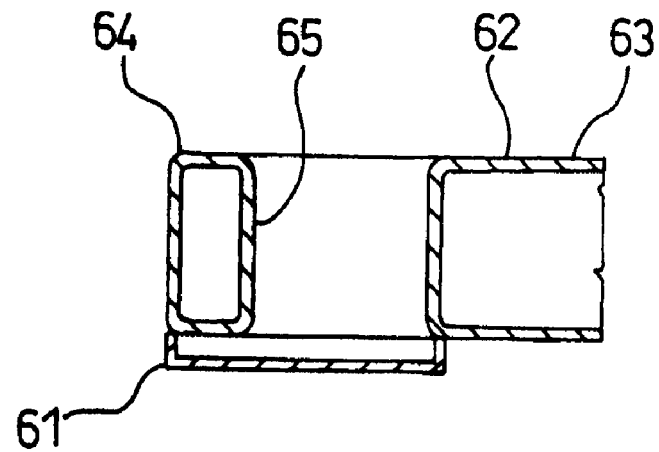

Then, a high-frequency cooking apparatus in a fourth embodiment according to the invention will be described referring to FIGS. 5(a) and (b). FIG. 5(a) is a perspective view of an outer appearance of a water tank and a tray to be used in the high-frequency cooking apparatus in the fourth embodiment according to the invention, in an assembled state, and FIG. 5(b) is a sectional view of the water tank and the tray in FIG. 5(a) in the assembled state. The same or the substantially same parts as those in the first embodiment will be omitted from description or will be briefly described.

As shown in FIG. 5(a), a tray 61 to be used in the high-frequency cooking apparatus 60 in the fourth embodiment is assembled to a front face of a water tank 62 in a lower part thereof. This tray 61 has a substantially same width as the lateral width of the body 11 of the high-frequency cooking apparatus and a predetermined depth, and opens upward.

The water tank 62 to be used in the high-frequency cooking apparatus 60 in the fourth embodiment is molded of transparent or translucent resin material, for example, and formed into a hollow box-like shape having a substantially T-shape. The water tank 62 includes a tank body 63, and an annular part 64 which is integrally formed on a front face of the tank body 63. The annular part 64 is formed in an annular shape corresponding to an outer shape of the tray 61, and an interior of the annular part 64 is communicated with the tank body 63. A water drop passage 65 is formed in a center part of the annular part 64 so as to vertically pass therethrough. The water tank 62 is provided with a water replenishing port (not shown) in a part of the tank body 63, for example.

As shown in FIG. 5(b), the tray 61 is assembled to a lower side of the annular part 64 of the water tank 62. Referring to FIG. 1, the tray 61 is inserted into the tray receiving part 18 from the front face of the body 11 of the high-frequency cooking apparatus, whereby its upper part will be positioned below the door panel 23 by way of the water drop passage 65 of the annular part 64. Accordingly, when the door panel 23 is opened after the high frequency and steam have been supplied and the object to be heated has been processed by heating, the tray 61 will receive frost water flowing out along the inner face of the door panel 23. Referring to FIG. 1, after the water has been stored, the water tank 62 is inserted into the water tank receiving part 19 from the front face of the body 11 of the high-frequency cooking apparatus, whereby the water tank 62 will be arranged below the body 11 of the high-frequency cooking apparatus. On this occasion, since the annular part 64 of the water tank 62 is arranged on the front face of the body 11 of the high-frequency cooking apparatus, an amount of the water stored in the water tank 62 can be visually confirmed through the annular part 64.

In the high-frequency cooking apparatus 60 in the fourth embodiment, daily cleaning can be conducted by taking out the tray 61 only, and hence, the high-frequency cooking apparatus 60 is hygienically favorable.

According to the high-frequency cooking apparatus 60 in the fourth embodiment as described above, because the water tank 62 in which water for generating steam is stored and the tray 61 are arranged below the body 11 of the high-frequency cooking apparatus, the water tank 62 is not positioned adjacent to the heating chamber. Therefore, even in case where the heating chamber has been heated to high temperature, the heat will move upwardly, and the water stored inside the water tank will not be heated. Moreover, because the water tank 62 is detachably assembled to the front face of the body 11 of the high-frequency cooking apparatus, it is possible to install the high-frequency cooking apparatus having its side part positioned close to the wall. Further, because the water tank 62 is not arranged above the electronic equipment 16 which is contained in the bottom of the body 11 of the high-frequency cooking apparatus, the electronic equipment 16 will not be damaged. Still further, because the water tank 62 and the tray 61 can be simultaneously taken out from the front face of the body 11 of the high-frequency cooking apparatus, good handling performance can be obtained. Still further, the tray 61 for receiving frost water which will flow out along the inner face of the door panel 23, when the door panel 23 is opened after the high frequency and steam have been supplied and the object to be heated has been processed by heating, is integrally assembled to the water tank 62. Therefore, as compared with a case where the water tank is arranged in the side part of the body of the high-frequency cooking apparatus and the tray is arranged on the front face of the body of the high-frequency cooking apparatus, it is possible to contain the water tank 62 and the tray 61 in one place. Consequently, there is no useless space, and the high-frequency cooking apparatus can be made compact. Still further, because the tray 61 is arranged in front of the water tank 62, replenishment of water to the water tank 62 and cleaning of the tray 61 can be simultaneously performed, and hence, daily maintenance can be easily conducted. Still further, the tray 61 and the water tank 62 are arranged above and below in front of the body 11 of the high-frequency cooking apparatus, it is possible to confirm the remaining amount of the water through the annular part 64 of the water tank 62 which is positioned above, without taking out the water tank 62. In this manner, it is possible to enhance installing performance, handling performance and quality of the high-frequency cooking apparatus.

Fifth Embodiment

Figure 6:
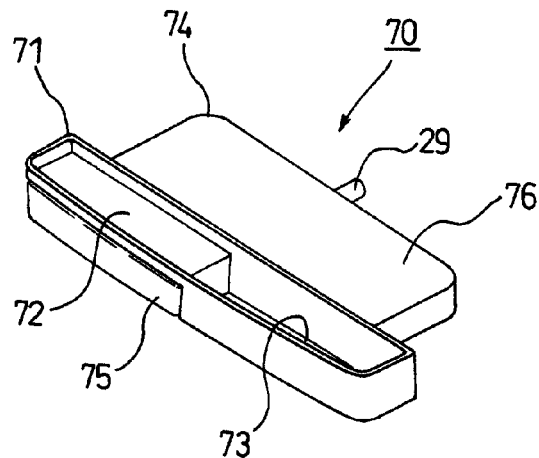
FIG. 6(a) is a perspective view of an outer appearance of a water tank and a tray to be used in the high-frequency cooking apparatus in a fifth embodiment according to the invention, in a state assembled to each other.
FIG. 6(b) is a perspective view of an outer appearance of the water tank only.
Figure 6:
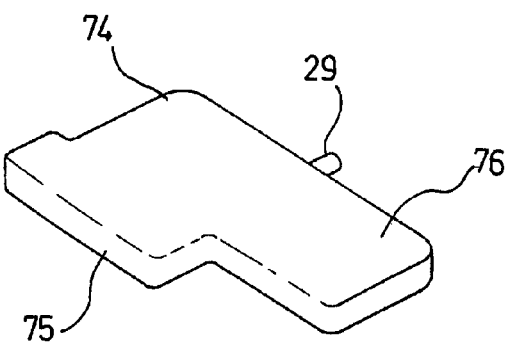

Then, a high-frequency cooking apparatus in a fifth embodiment according to the invention will be described referring to FIGS. 6(a) and (b). FIG. 6(a) is a perspective view of an outer appearance of a water tank and a tray to be used in the high-frequency cooking apparatus in the fifth embodiment according to the invention, in an assembled state, and FIG. 6(b) is a perspective view of an outer appearance of the water tank only in FIG. 6(a). The same or the substantially same parts as those in the first embodiment will be omitted from description or will be briefly described.

As shown in FIG. 6(a), a tray 71 to be used in the high-frequency cooking apparatus 70 in the fifth embodiment is molded of transparent or translucent resin material, for example. The tray 71 has a substantially same width as the lateral width of the body 11 of the high-frequency cooking apparatus, and includes a first tray part 72 having a shallow depth in a left half thereof, and a second tray part 73 having a deeper depth in a right half thereof which are integrally molded and open upward. The tray 71 is assembled to an extended part 75 which is formed on a front face of a water tank 74. Referring to FIG. 1, the tray 71 is inserted into the tray receiving part 18 from the front face of the body 11 of the high-frequency cooking apparatus, whereby its upper part which is open will be positioned below the door panel 23. Accordingly, when the door panel 23 is opened after the high frequency and steam have been supplied and the object to be heated has been processed by heating, the tray 71 will receive frost water flowing out along the inner face of the door panel 23.

As shown in FIG. 6(b), the water tank 74 to be used in the high-frequency cooking apparatus 70 in the fifth embodiment is molded of transparent or translucent resin material, for example, in the same manner as the tray 71. The water tank 74 has a tank body 76, and the extended part 75 to be placed below the first tray part 72 of the tray 71 is projected forward from the tank body 76. Water is stored in the tank body 76 and the extended part 75 of the water tank 74. Referring to FIG. 1, after the water has been stored, the water tank 74 is inserted into the water tank receiving part 19 from the front face of the body 11 of the high-frequency cooking apparatus, whereby the water tank 74 will be arranged below the body 11 of the high-frequency cooking apparatus. On this occasion, since the extended part 75 of the water tank 74 is arranged on the front face of the body 11 of the high-frequency cooking apparatus, an amount of the water stored in the water tank 74 can be visually confirmed through the extended part 75. The tray 71 may be integrally molded on the extended part 75 of the water tank 74. Alternatively, the tray 71 and the water tank 74 may be formed separately and then, bonded to each other by an adhesive or the like. The water tank 74 is provided with a water replenishing port (not shown) in a part of the tank body 76, for example.

According to the high-frequency cooking apparatus 70 in the fifth embodiment as described above, because the water tank 74 in which water for generating steam is stored and the tray 71 are arranged below the body 11 of the high-frequency cooking apparatus, the water tank 74 is not positioned adjacent to the heating chamber. Accordingly, even in case where the heating chamber has been heated to high temperature, the heat will move upwardly, and the water stored inside the water tank will not be heated. Moreover, because the water tank 74 is detachably assembled to the front face of the body 11 of the high-frequency cooking apparatus, it is possible to install the high-frequency cooking apparatus having its side part positioned close to the wall. Further, because the water tank 74 is not arranged above the electronic equipment 16 which is contained in the bottom of the body 11 of the high-frequency cooking apparatus, the electronic equipment 16 will not be damaged. Still further, because the water tank 74 and the tray 71 can be simultaneously taken out from the front face of the body 11 of the high-frequency cooking apparatus, good handling performance can be obtained. Still further, the tray 71 for receiving frost water which will flow out along the inner face of the door panel 23, when the door panel 23 is opened after the high frequency and steam have been supplied and the object to be heated has been processed by heating, is integrally assembled to the water tank 74. Therefore, as compared with a case where the water tank is arranged in the side part of the body of the high-frequency cooking apparatus and the tray is arranged on the front face of the body of the high-frequency cooking apparatus, it is possible to contain the water tank 74 and the tray 71 in one place. Accordingly, there is no useless space, and the high-frequency cooking apparatus can be made compact. Still further, because the tray 71 is arranged in front of the water tank 74, replenishment of water to the water tank 74 and cleaning of the tray 71 can be simultaneously performed, and hence, daily maintenance can be easily conducted. Still further, the tray 71 and the water tank 74 are arranged right and left in front of the body 11 of the high-frequency cooking apparatus, it is possible to confirm the remaining amount of water through the extended part 75 of the water tank 74 at the left side where the tray 71 is not arranged, without taking out the water tank 74. In this manner, it is possible to enhance installing performance, handling performance and quality of the high-frequency cooking apparatus.

In the high-frequency cooking apparatus 70 in the fifth embodiment, it is possible to appropriately exchange right and left positions of the first and second tray parts 72, 73 of the tray 71. In this case, it is apparent that right and left positions of the extended part 75 of the water tank 74 should be also exchanged.

Sixth Embodiment

Figure 7:
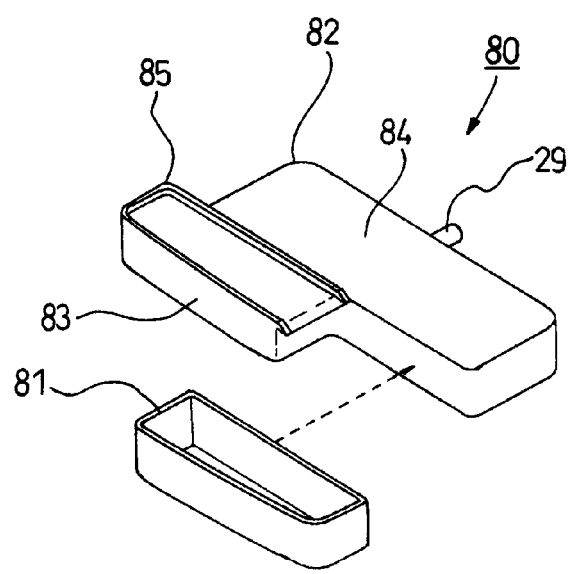
FIG. 7 is a perspective view of an outer appearance of a water tank and a tray to be used in the high-frequency cooking apparatus in a sixth embodiment according to the invention, before they are assembled to each other.

Then, a high-frequency cooking apparatus in a sixth embodiment according to the invention will be described referring to FIG. 7. FIG. 7 is a perspective view of an outer appearance of a water tank and a tray to be used in the high-frequency cooking apparatus in the sixth embodiment according to the invention, before they are assembled to each other. The same or the substantially same parts as those in the first embodiment will be omitted from description or will be briefly described.

As shown in FIG. 7, a tray 81 to be used in the high-frequency cooking apparatus 80 in the sixth embodiment is molded of transparent or translucent resin material, for example. The tray 81 has a width corresponding to a left half of the body 11 of the high-frequency cooking apparatus in the lateral direction and a predetermined depth, and opens upward. The tray 81 is assembled to a right side of an extended part 83 which is formed on a front face of a water tank 82.

The water tank 82 to be used in the high-frequency cooking apparatus 80 in the sixth embodiment is molded of transparent or translucent resin material, for example, in the same manner as the tray 81. The water tank 82 has a tank body 84, and the extended part 83 which has a width corresponding to the left half of the body 11 of the high-frequency cooking apparatus in the lateral direction is projected forward from the tank body 84. Water is stored in the tank body 84 and the extended part 83 of the water tank 82. An auxiliary tray part 85 is formed on the extended part 83 of the water tank 82. This auxiliary tank part 85 has a width corresponding to the left half of the body 11 of the high-frequency cooking apparatus in the lateral direction, and will be arranged in such a manner that its right side end which is inclined downwardly from its left side end may be put on a left side end of the tray 81. The water tank 82 is provided with a water replenishing port (not shown) in a part of the tank body 84, for example.

In the high-frequency cooking apparatus 80 as described above, referring to FIG. 1, after the water has been stored, the water tank 82 is inserted into the water tank receiving part 19 from the front face of the body 11 of the high-frequency cooking apparatus, whereby the water tank 82 will be arranged below the body 11 of the high-frequency cooking apparatus. On this occasion, since the extended part 83 of the water tank 82 is arranged on the front face of the body 11 of the high-frequency cooking apparatus, an amount of the water stored in the water tank 82 can be visually confirmed through the extended part 83. Moreover, referring to FIG. 1, the tray 81 is inserted into the tray receiving part 18 from the front face of the body 11 of the high-frequency cooking apparatus, whereby its upper part which is open will be positioned below the door panel 23. At the same time, the auxiliary tray part 85 is positioned below the door panel 23. Accordingly, when the door panel 23 is opened after the high frequency and steam have been supplied and the object to be heated has been processed by heating, the tray 81 and the auxiliary tray part 85 will receive frost water flowing out along the inner face of the door panel 23. On this occasion, the frost water which has fallen on the auxiliary tray part 85 will fall by the inclination into the tray 81 from the right side end thereof.

According to the high-frequency cooking apparatus 80 in the sixth embodiment as described above, the water tank 82 in which water for generating steam is stored and the tray 81 are arranged below the body 11 of the high-frequency cooking apparatus, and therefore, the water tank 82 is not positioned adjacent to the heating chamber. Accordingly, even in case where the heating chamber has been heated to high temperature, the heat will move upwardly, and the water stored inside will not be heated. Moreover, because the water tank 82 is detachably assembled to the front face of the body 11 of the high-frequency cooking apparatus, it is possible to install the high-frequency cooking apparatus having its side part positioned close to the wall. Further, because the water tank 82 is not arranged above the electronic equipment 16 which is contained in the bottom of the body 11 of the high-frequency cooking apparatus, the electronic equipment 16 will not be damaged. Still further, because the water tank 82 and the tray 81 can be simultaneously taken out from the front face of the body 11 of the high-frequency cooking apparatus, good handling performance can be obtained. Still further, the tray 81 for receiving frost water which will flow out along the inner face of the door panel 23, when the door panel 23 is opened after the high frequency and steam have been supplied and the object to be heated has been processed by heating, is integrally assembled to the water tank 82. Therefore, as compared with a case where the water tank is arranged in the side part of the body of the high-frequency cooking apparatus and the tray is arranged on the front face of the body of the high-frequency cooking apparatus, it is possible to contain the water tank 82 and the tray 81 in one place. Accordingly, there is no useless space, and the high-frequency cooking apparatus can be made compact. Still further, because the tray 81 is arranged in front of the water tank 82, replenishment of water to the water tank 82 and cleaning of the tray 81 can be simultaneously performed, and hence, daily maintenance can be easily conducted. Still further, the tray 81 and the water tank 82 are arranged right and left in front of the body 11 of the high-frequency cooking apparatus, it is possible to confirm the remaining amount of water through the extended part 83 of the water tank 82 at a left side where the tray 81 is not arranged, without taking out the water tank 82. In this manner, it is possible to enhance installing performance, handling performance and quality of the high-frequency cooking apparatus.

The high-frequency cooking apparatus 80 in the sixth embodiment has substantially the same operation and effects as the high-frequency cooking apparatus in the first embodiment, and therefore, the operation and effects are not described here. Position of the auxiliary tray 85 may be appropriately changed from the left to the right.

In this case, it is apparent that position of the extended part 83 of the water tank 82 should be also changed from the left to the right, and position of the tray 81 should be changed from the right to the left, in the same manner.

Figure 8:
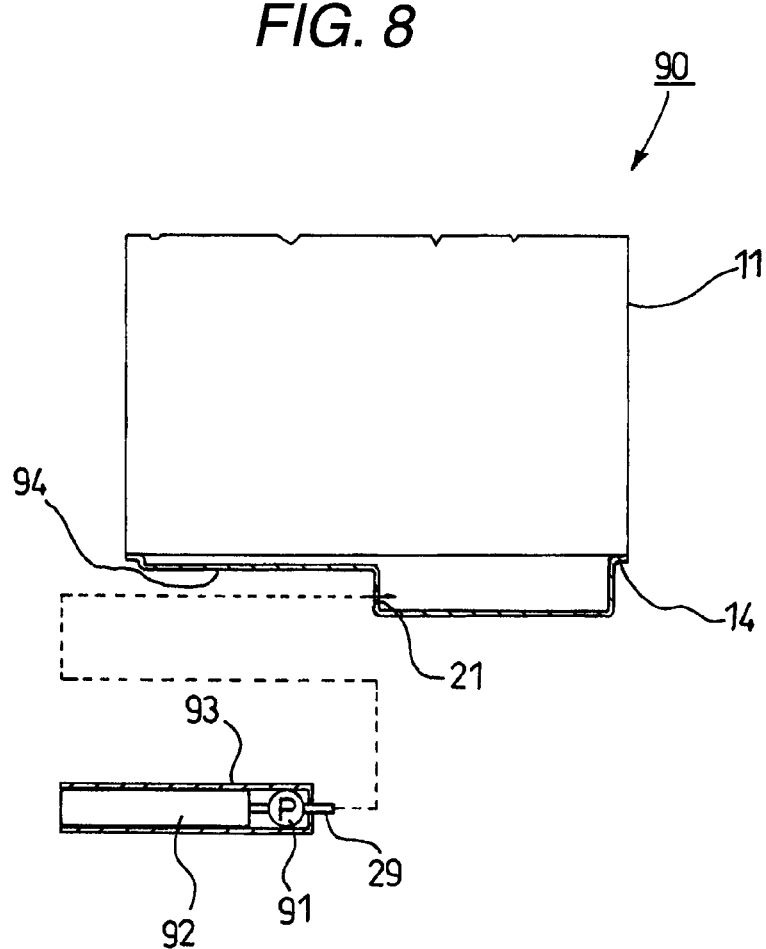
FIG. 8 is a sectional view of a water tank and a body of a high-frequency cooking apparatus in a modification of the high-frequency cooking apparatus according to the invention, before they are assembled to each other.

Now, a modified embodiment of the high-frequency cooking apparatus according to the invention will be described referring to FIG. 8. FIG. 8 is a sectional view of a body of the high-frequency cooking apparatus and a water tank in the modified embodiment of the high-frequency cooking apparatus according to the invention, before they are assembled to each other. The same or the substantially same parts as those in the first embodiment will be omitted from description or will be briefly described.

As shown in FIG. 8, in a high-frequency cooking apparatus 90 in this modified embodiment, a pump 91 which belongs to the electronic equipment 16 and a water tank 92 are formed as an integral module. The pump 91 and the water tank 92 are contained in a casing 93.

In the high-frequency cooking apparatus 90 having such structure, an assembling part 94 in a concave shape is formed on a front face of the bottom plate 14 which closes the lower part of the body 11 of the high-frequency cooking apparatus. The casing 93 which contains the pump 91 and the water tank 92 is assembled to the assembling part 94. According to this structure, the pump 91 which is easily affected by heat generally is positioned apart from the heating chamber and below the bottom plate 14. Consequently, the heat will not be applied to the pump 91, and hence, performance of the pump 91 can be ensured.

By the way, in the above described embodiments, in order to reliably and completely discharge the water in the water tank from the joint which is a discharge port of the water, it is desirable that an inner bottom face of the water tank has a downward inclination toward the joint.

Figure 9:
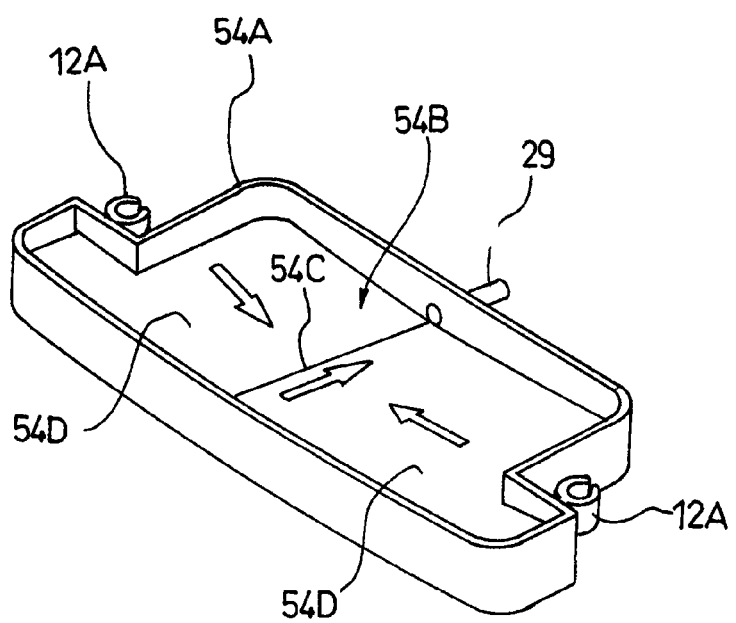
FIG. 9 is a perspective view showing an essential part of a modification of the water tank according to the invention.

FIG. 9 shows an example in which an inner bottom face 54B of a water tank 54A in the above described third embodiment has a downward inclination toward the joint 29.

The inner bottom face 54B includes the lowermost portion 54C where an extension line of the joint 29 has a downward inclination toward a base end of the joint 29, and a pair of flat faces 54D are symmetrically formed at both sides of the lowermost portion 54C. These flat faces 54D have respectively downward inclinations toward the lowermost portion 54C. As the results, the inner bottom face 54B has a so-called vessel-like shape.

According to the water tank 54A of this structure, the inner bottom face 54B has the downward inclination toward the joint 29, and hence, the water in the water tank can be reliably and completely discharged from the joint 29. In this manner, a desired amount of steam can be generated more stably.

Particularly, according to the water tank 54A, due to the inner bottom face 54B having the vessel-like shape, the water in the water tank can be more reliably guided to the joint 29, as compared with a case where the inner bottom face is flat.

Figure 10:
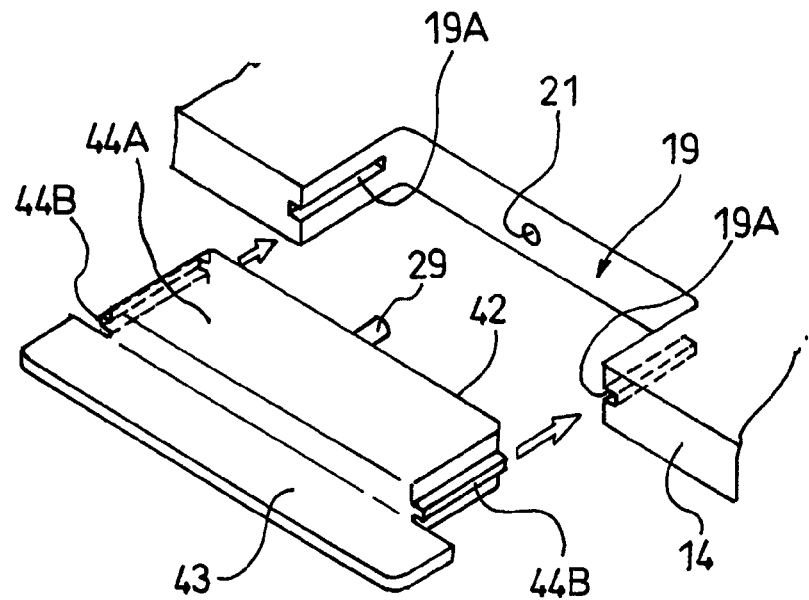
FIGS. 10(a) and (b) are schematic views showing modifications of a supporting structure for the water tank and tray with respect to a body of the high-frequency cooking apparatus according to the invention.
Figure 10:
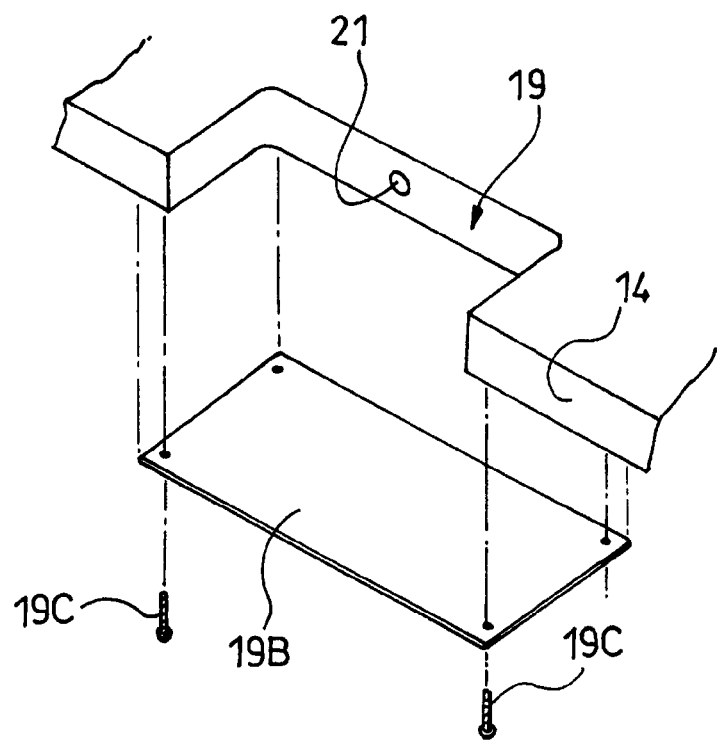

In the above described embodiments, the tray and the water tank are supported by inserting the joint into the joint insertion hole which is provided in the body of the high-frequency cooking apparatus, and by engaging the engaging parts in a substantially C-shape respectively with the rubber legs. However, alternative supporting structures are shown in FIG. 10.

A water tank 44A as shown in FIG. 10(A) is provided with ribs 44B on both side faces thereof. The ribs 44B are inserted into grooves 19A which are formed in the water tank receiving part 19, whereby the water tank 44A will be guided to a determined position and held.

It is to be noted that the ribs may be formed in the water tank receiving part, and the grooves may be formed in the water tank.

A supporting structure as shown in FIG. 10(B) includes a support plate 19B which is fixed to the bottom plate 14 with screws 19C so as to close an opening in a lower part of the water tank receiving part 19.

In the above described second to sixth embodiments, the water tank and tray are integrally attached to the lower part of the body of the high-frequency cooking apparatus, and taken out also integrally, even though they are constructed as separate members.

However, in case where water is supplied to the water tank during cooking, good handling performance could be obtained with the structure in which the tank only can be taken out, in a state where the tray is kept attached to the lower part of the body of the high-frequency cooking apparatus.

On the other hand, in case where the water remains in the tray is discharged, good handling performance could be obtained with the structure in which the tray and the water tank can be integrally taken out, because the water tank can be also cleaned at the same time when the tray is cleaned.

In short, it would be preferable that the water tank only can be taken out, after the tray and water tank have been attached to the lower part of the body of the high-frequency cooking apparatus, in this invention.

Specifically, it is desirable that the tray is stacked on the upper part of the tank.

The invention is not limited to the above described embodiments, but may be appropriately modified or improved.

For example, the width and depth of the tray, the width and depth of the water tank, etc. may be appropriately selected and set, considering a design of the high-frequency cooking apparatus to which the invention is applied.

This application is based on Japanese Patent Applications Nos. 2004-196644 and 2004-196895, the contents of which are hereby incorporated by reference.

The invention claimed is:

1. A high-frequency cooking apparatus for heat-processing an object to be heated by supplying high frequency and steam into a heating chamber, the high-frequency cooking apparatus, comprising:
   a water tank that stores water for generating the steam, wherein the water tank is detachably disposed in a dented part which is formed in a bottom plate provided in a lower part of a body of the high-frequency cooking apparatus having the heating chamber, the dented part being formed in the bottom plate so as to be separated from an installing face on which the cooking apparatus is to be installed by applying drawing work to the bottom plate, and wherein the water tank is arranged below the bottom plate, and
   an electronic equipment mounted on the bottom plate.

2. A high-frequency cooking apparatus for heat-processing an object to be heated by supplying high frequency and steam into a heating chamber, the high-frequency cooking apparatus, comprising:
   a water tank that stores water for generating the steam, wherein the water tank is detachably disposed in a dented part which is formed in a bottom plate provided in a lower part of a body of the high-frequency cooking apparatus having the heating chamber, the dented part being formed in the bottom plate so as to be separated from an installing face on which the cooking apparatus is to be installed by applying drawing work to the bottom plate,
   wherein the water tank is arranged at an upstream side in a cooling path for an electronic equipment which is contained in a bottom part of the body of the high-frequency cooking apparatus.

3. A high-frequency cooking apparatus for heat-processing an object to be heated by supplying high frequency and steam into a heating chamber, the high-frequency cooking apparatus, comprising:
   a water tank that stores water for generating the steam, wherein the water tank is detachably disposed in a dented part which is formed in a bottom plate provided in a lower part of a body of the high-frequency cooking apparatus having the heating chamber, the dented part being formed in the bottom plate so as to be separated from an installing face on which the cooking apparatus is to be installed by applying drawing work to the bottom plate,
   wherein an inner bottom face of the water tank has a downward inclination toward a water discharge port.

4. The high-frequency cooking apparatus according to claim 3, wherein the inner bottom face has a substantially vessel-like shape.

5. A high-frequency cooking apparatus for heat-processing an object to be heated by supplying high frequency and steam into a heating chamber, the high-frequency cooking apparatus, comprising:
   a water tank that stores water for generating the steam; and
   a tray that is integrally assembled to the water tank, wherein the water tank and the tray are detachably assembled toward the to a front face in a lower part of a body of the high-frequency cooking apparatus having the heating chamber.

6. A high-frequency cooking apparatus for heat-processing an object to be heated by supplying high frequency and steam into a heating chamber, the high-frequency cooking apparatus, comprising:
- a water tank that stores water for generating the steam; and
- a tray that is integrally assembled to the water tank,
- wherein the water tank is detachably disposed toward the front in a lower part of a body of the high-frequency cooking apparatus having the heating chamber; and
- wherein the tray is arranged in front of the water tank.

7. A high-frequency cooking apparatus for heat-processing an object to be heated by supplying high frequency and steam into a heating chamber, the high-frequency cooking apparatus, comprising:
- a water tank that stores water for generating the steam; and
- a tray that is integrally assembled to the water tank,
- wherein the water tank is detachably disposed toward the front in a lower part of a body of the high-frequency cooking apparatus having the heating chamber; and
- wherein the tray and the water tank are arranged right and left at a front side of the body of the high-frequency cooking apparatus.

8. A high-frequency cooking apparatus for heat-processing an object to be heated by supplying high frequency and steam into a heating chamber, the high-frequency cooking apparatus, comprising:
- a water tank that stores water for generating the steam; and
- a tray that is integrally assembled to the water tank,
- wherein the water tank is detachably disposed toward the front in a lower part of a body of the high-frequency cooking apparatus having the heating chamber; and
- wherein the tray and the water tank are arranged above and below at a front side of the body of the high-frequency cooking apparatus.

* * * * *